3,779,976
ACRYLIC POLYMER MODIFIED POLYVINYL FLUORIDE COATING COMPOSITIONS
Henry J. De Marsico, Glassboro, N.J., Daniel Strugar, Brunswick, Ohio, and Dao-Tsing Wu, Villanova, Pa., assignors to E. I. du Pont de Nemours and Company, Wilmington, Del.
Continuation-in-part of abandoned application Ser. No. 47,558, June 18, 1970. This application Oct. 22, 1971, Ser. No. 191,905
Int. Cl. C08f 45/34
U.S. Cl. 260—32.8 R 7 Claims

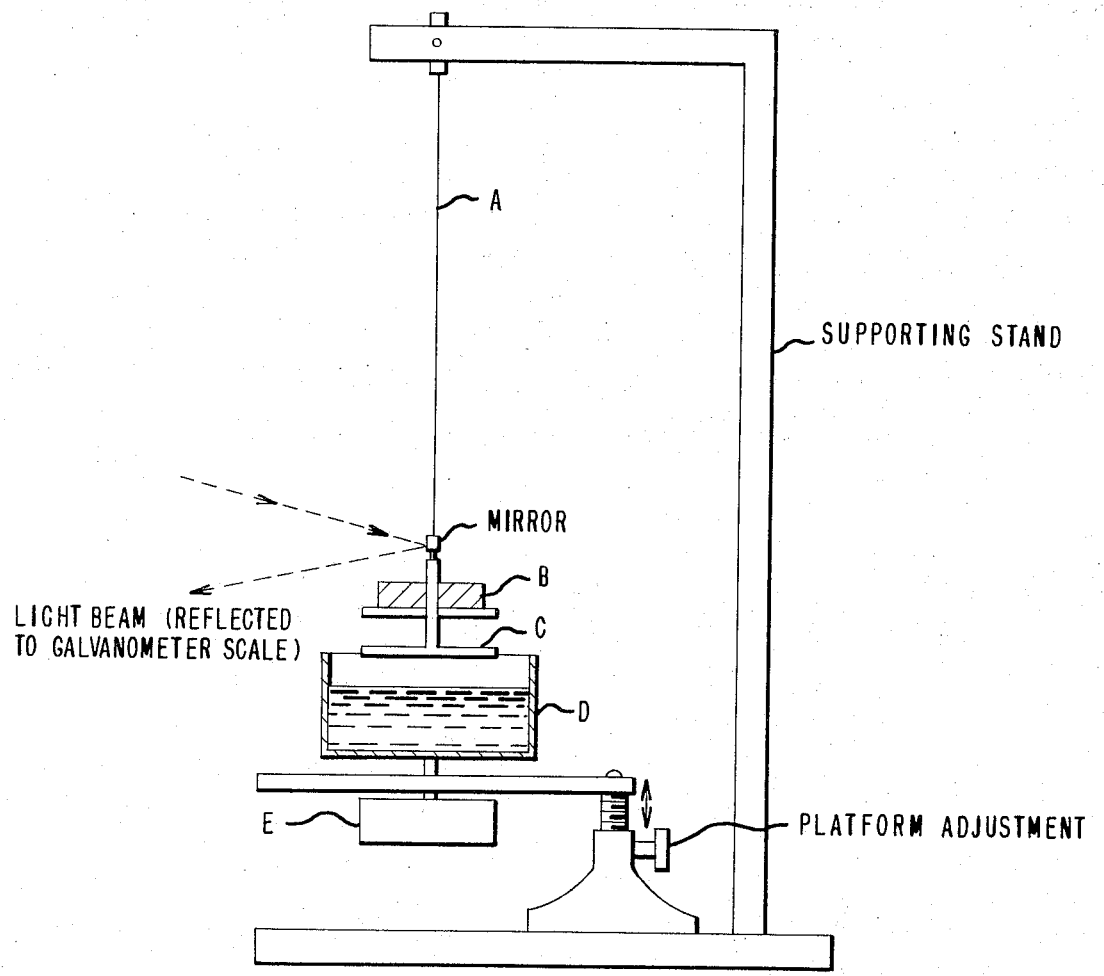

ABSTRACT OF THE DISCLOSURE

Coating compositions comprising particulate polyvinyl fluoride, acrylic polymer, and an organic solvent for the acrylic polymer which is a nonsolvent for the polyvinyl fluoride, having good rheology are provided.

CROSS REFERENCE TO RELATED APPLICATION

This application is a continuation-in-part of application Ser. No. 47,558 filed June 18, 1970, now abandoned.

SUMMARY OF THE INVENTION

The present invention provides polyvinyl fluoride in coating compositions containing specific amounts of acrylic polymer, a solvent for the acrylic polymer, and a nonsolvent for the polyvinyl fluoride which compositions have good flow characteristics.

The invention is a composition comprised of a mixture of particulate polyvinyl fluoride and acrylic polymer containing acid function, said polyvinyl fluoride and acrylic polymer being present in the respective ratios of from about 25/75 to 99/1 by weight, said mixture forming about 5 to 50% by weight of the composition and solvent for the acrylic copolymer which is a nonsolvent for the polyvinyl fluoride and also acts as a coalescing solvent for the composition, said solvent forming from about 40 to 85% by weight of the composition. The solvent is comprised of propylene carbonate or butyrolactone or mixtures thereof and isophorone, and at least 5% alkyl alcohol by total weight of solvent, said alcohol being preferably a lower alkyl alcohol such as isopropyl alcohol which composition has been found especially suitable with $TiO_2$ as pigment.

A preferred composition comprises a mixture of particulate polyvinyl fluoride, acrylic polymer containing an acid function and solvent for said acrylic polymer which is a coalescing solvent for polyvinyl fluoride wherein the ratio of polyvinyl fluoride to acrylic polymer is on a weight basis between about 70/30 to 98/2, the mixture of polyvinyl fluoride and acrylic polymer forming between 25 and 32% and most preferably between 26 and 29% by weight of the composition with a total solids content of between 44 and 50% and the solvent blend is being a mixture of isophorone and propylene carbonate present by weight in the ratio of about 60/40 to about 40/60 most preferably about 50/50, and a lower alkyl alcohol in an amount of between 5 and 12% by weight based on total weight of solvent. With certain pigments such compositions will have a shear viscosity less than 1500 poises and yield stress less than 5 dynes/cm.$^2$ at 35% solids concentration by volume at 70° C. A ratio of polyvinyl fluoride to acrylic polymer from about 85/15 to 95/5 by weight is most suitable. The composition wherein the acrylic polymer is comprised of methyl methacrylate, butyl acrylate and itaconic acid is preferred.

The coating composition can contain up to 35% by weight of pigment. The acid function of the acrylic polymer assists in providing good rheology with pigment present.

The invention also comprises coating a substrate by applying the aforementioned coating compositions.

This invention encompasses the use, with dispersed polyvinyl fluoride particles, of a soluble acrylic polymer containing acid groups and a solvent medium. There should be a solubility balance such that the acrylic polymer alters the insoluble polyvinyl fluoride particles thereby preventing them from flocculating. This allows formulation of paints containing particulate polyvinyl fluoride having enhanced flow at high solids.

The aforementioned acrylic can be a polymer or mixture of polymers of acrylic and methacrylic acids and their amides, nitriles, and esters and mixtures thereof. The acrylic polymer should also contain a carboxylic acid function. Illustrative of acceptable carboxylic containing acrylic monomers which can be copolymerized with the aforementioned monomers are itaconic acid, acrylic acid, and methacrylic acid. Other dibasic acids include maleic and fumaric acids in addition to others which are copolymerizable.

Acrylic polymers with aminosilane moieties such as those which (for example) reacted with free carboxyl groups in the acid function are not included in the scope of the term "acrylic polymers."

Typical acrylic polymers suitable for use in this invention have a weight average molecular weight between 20,000 and 80,000 and preferably between 40,000 and 70,000 determined by light scattering using an instrument such as a Bryce Phoenix Universal Light Scattering Photometer.

Typical polyvinyl fluoride polymers suitable for use in this invention have a weight average molecular weight of between 500,000 and 1,500,000 and preferably about 1,000,000, as determined by light scattering as aforementioned.

In addition to the aforementioned acrylic polymer and polyvinyl fluoride, other acrylic polymers containing pendant functionalities which may contribute to the adhesion, durability, etc., of the composition can also be blended into the polymeric mixture. Such other acrylic polymer includes copolymers of methyl methacrylate and 3-(2-methacryloxyethyl) - 2,2 - spirocyclohexyl oxazolidine, 2-hydroxy-3-amino propyl methacrylate, 2-(1-aziridinyl)ethyl methacrylate, N,N - dimethyl,2-aminoethyl methacrylate, N,N - diethyl,2-aminoethyl methacrylate, t-butyl aminoethyl methacrylate and the acrylate analogs of the above.

The amount of acrylic polymer used is dependent upon the amount of polyvinyl fluoride to be used in the coating composition. The ratio of polyvinyl fluoride to acrylic polymer can range from 25/75 to 99/1 by weight, respectively, 70/30 to 98/2 being preferred, with 85/15 to 95/5 by weight especially preferred.

"Solvent" as used herein includes blends of individual chemical components, such as solvent blends.

The choice of proper solvent for the aforementioned polymers is important. Proper solvency balance will promote adsorption of the acrylic polymer onto the polyvinyl fluoride particles and coalescence of the polyvinyl fluoride particles and improve rheology.

The presence of pigment and type of pigment also affects rheological considerations. Rheology without the presence of pigment differs from the rheology with pigment and the effect on rheology of other components may be altered by the presence of pigment and type of pigment.

It is desirable to provide a low shear viscosity low shear stress material at high solids content in any coating composition. As will be understood different solids contents and ratio of proportions of solid component affects the rheology of the coating composition.

$TiO_2$ pigment with polyvinyl fluoride and acrylic polymer and a solvent combination of isophorone, propylene carbonate and isopropyl alcohol as set forth herein can provide a composition having yield stress below 15 dynes/cm.$^2$ and preferably 5 dynes/cm.$^2$ and shear viscosity below 1500 poises and preferably below 500 poises at 35% volume solids as set forth in Example 6.

Other pigments thought suitable to provide similar yield stress and shear viscosity values in a polyvinyl fluoride/acrylic composition in these specific solvent compositions as set forth in the next paragraph are iron oxide, cobalt titanate, calcined mixture of aluminum, cobalt oxides, lampblack, co-calcined mixture of nickel titanate, antimony oxide and iron aluminum titanate.

The isophorone/propylene carbonate is desirably kept between a weight ratio of between about 60/40 to about 40/60 and most preferably about 50/50 with the solvent also containing between about 5 and 12% by total weight of solvent, of isopropyl alcohol.

Because of the improved performance of propylene carbonate in the presence of compositions such as used in coil coating rollers, propylene carbonate is preferred over butyrolactone. Alkyl alcohol (unsubstituted hydrocarbon), especially lower alkyl alcohols, should suffice in lieu of isopropyl alcohol. Alcohols such as ethyl, butyl and hexyl for example should be suitable substitutes.

The use of additional solvent components should be acceptable if they do not interfere with the improved rheology and the coating properties. These may be desired to lower solvent costs. Such solvents as selected from aromatic hydrocarbons and ketones and other alcohols could be suitable diluents depending on the solids level an nature of the constituents in the composition.

As will be understood herein, different pigments have different wetting characteristics and modification of solvent and proportions of components thereof may be required to attain the desired rheology. With $TiO_2$ pigment as disclosed herein in a polyvinyl fluoride acrylic polymer system the aforementioned solvent blend is preferred. A yield stress of less than 15 dynes/cm.$^2$ and shear viscosity of less than 1500 poises can be obtained in one embodiment of this invention. Use of the preferred solvents herein—isophorone and propylene carbonate in the weight ratio of 60/40 to 50/50 with between 5 and 12% alcohol such as isopropyl alcohol by weight with PVF and acrylic polymer as required herein, but with pigment other than $TiO_2$ or equivalents thereof for this purpose yields a useful product also within the scope of this invention.

The solvent blend should comprise from 40 to 85% by weight of a coating composition containing the aforementioned components i.e. the acrylic polymer, polyvinyl fluoride and solvent blend.

The acrylic polymer/polyvinyl fluoride mixture can form from 5 to 50% by weight of the total coating composition. Between about 25 and 32%, typically between about 26 and 29% by weight of the composition of the acrylic polyvinyl fluoride mixture is preferred at a preferred total solids content of between about 44 to 50%. Pigment can be present in amounts up to 35% by weight total. $TiO_2$ is a preferred white pigment and is desirably present in an amount of 18 to 21% and in one embodiment between 18 and 20% by weight of total composition at a level of between 26 and 29% by weight of total composition of acrylic/polyvinyl fluoride mixture.

The percent solids of the coating composition during application should not exceed 60% solids or the viscosity will be too high and preclude the composition from being applied to a substrate by conventional application methods. A solids content below 15% is not commercially practical although it is easily formulated; however, for manufacturing, packaging, and shipping purposes, any solids content percentage may be practical.

A preferred coating composition mixture is about a 50/29/21 (such as in Example 5) mixture of solvent, acrylic/polyvinyl fluoride, and pigment, respectively. Solids concentration includes both the polyvinyl fluoride and acrylic polymer in addition to any other particulate such as pigment which may be present.

Yield stress, and shear viscosity below 1000 poises are determined using a torsional viscometer as in FIG. 1.

In the torsional viscometer bearing function is eliminated by using a torsion wire to support a disk which is submerged in the test liquid. The effective shear rate for the instrument is 0.04 sec. Using a tension wire (A) of 5 mil diameter wire a viscosity as low as 0.01 poise is measurable. In the torsional viscometer disk (C) of 2 inch diameter and ⅛ inch thickness is immersed in dish (D) of 2.75 inch diameter which is 2 inches high. The disk with 200 gram load (B) is suspended from torsion wire (A) of length 238 cm. The wire may be of varying diameter (stiffness) which can be calibrated in oils of known viscosity.

The fluid to be measured is contained in a circular dish resting on a vertically adjustable platform. The sample is raised until the dish is submerged in the sample. The dish is rotated by motor (E) at 0.25 r.p.m. The disk assembly (without weight) has a moment of inertia of 300 grams/cm.$^2$. With the 200 g. weight, the moment of inertia is 900 g./cm.

The static deflection of the disk is measured by the displacement of the indicated light beam from its equilibrium position.

By noting the maximum deflection of the disk the sample will support under static conditions one obtains a measure of the yield value (shear stress) required to initiate viscous flow, and shear viscosity.

To adjust a given composition to the proper solids level for a specimen to be tested, solids level may have to be raised or lowered. To lower solids level it is only necessary to gently stir in solvent of the same composition already present. To raise solids level a highly concentrated composition of the same components should be slowly stirred in. Addition of solids only should be avoided as will be apparent to the skilled artisan. Physical test measurements such as low shear viscosity and yield stress indicate the most desirable rheological properties of this invention which result in minimizing undesirable "ridging and veining" effects on application of the coating composition to a substrate.

Coating compositions of this invention can also be spray coated to produce tough durable finishes.

As will be understood, the compositions of this invention include those wherein there is present pigment of conventional type, ultraviolet screens, other heat stabilizers such as tin-mercaptan complexes, epoxy resin and tripentaerithritol for stabilization of PVF. Many other additives may be used so long as they do not interfere with the coating properties and the rheological properties.

The following examples illustrate the various aspects of the invention in greater detail.

Example 1

(1) 285.1 grams of isophorone and 240.1 grams of propylene carbonate were added to a quart mill and mixed thoroughly.

(2) 251.7 grams of polyvinyl fluoride powder was added to the above mixture with stirring and the resultant mixture stirred for an additional 30 minutes.

(3) 0.3 cc. of deionized water was added to the mixture of (2) followed by 30 more minutes of stirring.

(4) 119.0 grams of a methyl methacrylate/butyl acrylate/itaconic acid copolymer having a respective weight ratio of 58/40/2 at 37.7% resin by weight in 53.6% isopropyl alcohol and 9.1% isophorone were added to the mixture of (3) followed by 30 minutes of stirring.

(5) 207.0 grams of $TiO_2$ pigment and 3.0 cc. of thermal stabilizer were added to the mixture of (4) followed by 10 minutes of stirring.

(6) 0.6 quart of pebbles were added to the mixture of (5) and ground for 24 hours.

A coating composition having excellent rheological properties resulted.

Example 2

(1) 208.6 grams of isophorone and 224.3 grams of propylene carbonate were added to a quart mill and mixed thoroughly.

(2) 240.7 grams of polyvinyl fluoride powder was added to the above mixture with stirring and the resultant mixture stirred for an additional 30 minutes.

(3) 0.28 cc. of deionized water was added to the mixture of (2) followed by 30 more minutes of stirring.

(4) 171.1 grams of a methyl methacrylate/butyl acrylate/itaconic acid copolymer having a respective weight ratio of 78/20/2 at 25.6% resin by weight in 37.2% isopropyl alcohol and 37.2% isophorone were added to the mixture of (3) followed by 30 minutes of stirring.

(5) 197.9 grams of $TiO_2$ pigment and 3.18 cc. of thermal stabilizer were added to the mixture of (4) followed by 10 minutes of stirring.

(6) 0.6 quart of pebbles were added to the mixture of (5) and ground for 24 hours.

A coating composition having excellent rheological properties resulted.

Example 3

(1) 211.7 grams of isophorone and 226.8 grams of propylene carbonate were added to a quart mill and mixed thoroughly.

(2) 240.7 grams of polyvinyl fluoride powder was added to the above mixture with stirring and the resultant mixture stirred for an additional 30 minutes.

(3) 0.28 cc. of deionized water was added to the mixture of (2) followed by 30 more minutes of stirring.

(4) 165.5 grams of a methyl methacrylate/butyl acrylate/itaconic acid copolymer having a respective weight ratio of 93/5/2 at 26.5% resin by weight in 36.7% isopropyl alcohol and 36.8% isophorone were added to the mixture of (3) followed by 30 minutes of stirring.

(5) 197.9 grams of $TiO_2$ pigment and 3.18 cc. of thermal stabilizer were added to the mixture of (4) followed by 10 minutes of stirring.

(6) 0.6 quart of pebbles were added to the mixture of (5) and ground for 24 hours.

A coating composition having excellent rheological properties resulted.

Example 4

(1) 211.9 grams of isophorone and 227.3 grams of propylene carbonate were added to a quart mill and mixed thoroughly.

(2) 240.7 grams of polyvinyl fluoride powder was added to the above mixture with stirring and the resultant mixture stirred for an additional 30 minutes.

(3) 0.28 cc. of deionized water was added to the mixture of (2) followed by 30 more minutes of stirring.

(4) 164.5 grams of a methyl methacrylate/itaconic acid copolymer having a respective weight ratio of 98/2 at 26.6% resin by weight in 36.7% by weight isopropyl alcohol and 36.7% isophorone by weight were added to the mixture of (3) followed by 30 minutes of stirring.

(5) 197.9 grams of $TiO_2$ pigment and 3.18 cc. of thermal stabilizer were added to the mixture of (4) followed by 10 minutes of stirring.

(6) 0.6 quart of pebbles were added to the mixture of (5) and ground for 24 hours.

A coating composition having excellent rheological properties resulted.

Example 5

(1) 504.4 grams of isophorone and 412.4 grams of propylene carbonate were added to a one-gallon can and mixed.

(2) To this was added 133.4 grams of a polymer solution, the polymer being made of methyl methacrylate, butyl acrylate and itaconic acid in a weight ratio of 58/40/2 at 40% solids by weight in isopropyl alcohol, isophorone and propylene carbonate in a weight ratio of 65.7/18.8/15.5.

(3) While stirring, 528.0 grams of polyvinyl-fluoride powder was added to (2) and the resultant mixture was stirred for 30 minutes.

(4) To (3) was added 415.2 grams of $TiO_2$ pigment and 6 grams of epoxy resin as thermal stabilizer. This mixture was stirred for 30 minutes.

(5) Mixture (4) was slowly fed into a continuous, top-feed, laboratory sand grinder, which resulted in a good dispersion of both the polyvinylfluoride powder and the $TiO_2$ pigment in the acrylic resin solution.

(6) After grinding, 8.5 grams of an acrylic polymer solution was added to every 1000 grams of dispersion (5). The acrylic polymer consisted of 35 weight percent of a polymer made of 95% methyl methacrylate and 5% 3-(2'-methacryloxyethyl)-2-spirocyclohexyl oxazolidine. The solvents consisted of approximately 40 weight percent aromatic hydrocarbons and 60 weight percent butyrolactone.

After mixing (6) a coating composition having excellent rheological properties resulted.

Example 6

(1) 2522 grams of isophorone and 2062 grams of propylene carbonate were added together and thoroughly mixed.

(2) To this mixture was added 667 grams of an acrylic polymer solution, the polymer being made of methyl methacrylate, butyl acrylate and itaconic acid in a weight ratio of 58/40/2 at 40% solids by weight in isopropyl alcohol, isophorone and propylene carbonate present in a weight ratio of 65.7/18.8/15.5.

(3) While stirring 2640 grams of polyvinyl fluoride, powder was added to (2) and the resultant mixture was stirred for 30 minutes.

(4) To (3) was added 2076 grams of $TiO_2$ pigment and 30 grams of epoxy resin as thermal stabilizer. This mixture was stirred for one hour.

(5) Mixture (4) was fed at a rate of ¾ gallon per hour to a ½ gallon bottom feed laboratory sand grinder, which resulted in a good dispersion of both the polyvinyl fluoride powder and the $TiO_2$ pigment.

(6) After grinding, 26 grams of an acrylic polymer solution was added to every 1000 grams of dispersion (5). The acrylic polymer consisted of 35 weight percent of a polymer made of 95% methyl methacrylate and 5% 3-(2'-methacryloxyethyl)-2-spirocyclohexyl oxazolidine. The solvents consisted of approximately 40 weight percent aromatic hydrocarbons and 60 weight percent butyrolactone.

After mixing for 30 minutes, mixture (6) was found to have excellent rheological properties with a low shear viscosity of 436 poise and a yield stress of 4.7 dynes/square centimeter at 70° F.

We claim:

1. A composition comprised of a mixture of particulate polyvinyl fluoride and acrylic polymer containing acid function, said polyvinyl fluoride and acrylic polymer being present in the respective ratios of from about 25/75 to 99/1 by weight, said mixture forming about 5 to 50% by weight of the composition and solvent for the acrylic copolymer which is a nonsolvent for the polyvinyl fluoride and also acts as a coalescing solvent for the composition, said solvent forming from about 40 to 85% by weight of the composition and comprising (a) at least 35% by weight of solvent of propylene carbonate, butyrolactone or mixtures thereof, (b) isophorone present in an amount of between 40 and 60% by weight of (a) and (b) and (c) between about 5 and 12% by weight of solvent of an alkyl alcohol.

2. A composition comprised of a mixture of particulate polyvinyl fluoride, acrylic polymer containing an acid function and solvent for said acrylic polymer which is a coalescing solvent for polyvinyl fluoride wherein the ratio of polyvinyl fluoride to acrylic polymer is on a weight basis between about 70/30 to 98/2, the solids form between about 44% and 50% of the composition and the mixture of polyvinyl fluoride and acrylic polymer forms between 25 and 32% by weight of the composition and the solvent blend consists essentially of a mixture of isophorone and propylene carbonate present by weight in the ratio between about 60/40 and 50/50, and a lower alkyl alcohol present in an amount of between about 5 and 12% by weight based on total weight of solvent.

3. The composition of claim 2 wherein the ratio of polyvinyl fluoride to acrylic polymer is from about 85/15 to 95/5 by weight.

4. The composition of claim 2 wherein the lower alkyl alcohol is isopropyl alcohol.

5. The composition of claim 2 wherein the acid function monomer unit is at least one member of the class consisting of acrylic acid, methacrylic acid and itaconic acid.

6. The composition of claim 1 wherein there is present pigment in an amount of up to 35% by weight of the composition.

7. The composition of claim 2 wherein there is present pigment in an amount of up to 35% by weight of the composition.

References Cited

UNITED STATES PATENTS

| | | | |
|---|---|---|---|
| 3,340,222 | 9/1967 | Fung | 260—41 |
| 3,324,069 | 6/1967 | Koblitz | 260—31.4 |
| 3,644,255 | 2/1972 | Thompson | 260—29.1 R |
| 3,360,396 | 5/1967 | Neros | 260—41 |
| 3,320,206 | 12/1967 | Kennedy | 260—30.4 |
| 3,442,976 | 6/1969 | Gerek | 260—853 |
| 3,429,844 | 2/1969 | Neros | 260—29.1 |
| 3,000,844 | 9/1961 | Bro | 260—30.4 |

ALLAN LIEBERMAN, Primary Examiner

R. ZAITLEN, Assistant Examiner

U.S. Cl. X.R.

260—33.4 F, 33.6 F, 33.8 F, 900